US008376389B2

(12) United States Patent
Wrightman

(10) Patent No.: US 8,376,389 B2
(45) Date of Patent: Feb. 19, 2013

(54) SNOWMOBILE SKI ASSEMBLY

(76) Inventor: Robert A. Wrightman, Bracebridge (CA)

( * ) Notice: Subject to any disclaimer, the term of this patent is extended or adjusted under 35 U.S.C. 154(b) by 453 days.

(21) Appl. No.: 12/046,991

(22) Filed: Mar. 12, 2008

(65) Prior Publication Data

US 2008/0303228 A1 Dec. 11, 2008

Related U.S. Application Data

(60) Provisional application No. 60/894,252, filed on Mar. 12, 2007.

(30) Foreign Application Priority Data

Oct. 22, 2007 (CA) .................................. 2604041

(51) Int. Cl.
*B62B 17/02* (2006.01)
*B62B 17/04* (2006.01)
*A63C 5/04* (2006.01)

(52) U.S. Cl. ................. 280/606; 280/609; 280/11.18; 280/28.14

(58) Field of Classification Search ............ 280/28, 280/601, 606, 608, 11.18, 28.14, 609, 610; 180/9, 8.7, 9.25, 190
See application file for complete search history.

(56) References Cited

U.S. PATENT DOCUMENTS

| 573,034 | A | * | 12/1896 | Peterson | 280/7.12 |
|---|---|---|---|---|---|
| 1,521,818 | A | * | 1/1925 | Katona | 280/12.14 |
| 3,482,849 | A | | 12/1969 | Puetz | |
| 3,605,926 | A | | 9/1971 | Leonawicz | |
| 3,643,978 | A | | 2/1972 | Westberg | |
| 3,718,341 | A | | 2/1973 | Westberg | |
| 3,785,665 | A | | 1/1974 | Merenheimo et al. | |
| 3,817,544 | A | * | 6/1974 | Labelle | 280/28 |
| 3,844,367 | A | | 10/1974 | Flohr | |
| 3,857,578 | A | | 12/1974 | Alton | |
| 3,866,933 | A | | 2/1975 | Mollring | |
| 3,877,713 | A | | 4/1975 | Mabie et al. | |
| 3,897,839 | A | | 8/1975 | Brisebois | |
| 3,942,812 | A | | 3/1976 | Kozlow | |
| 3,977,485 | A | * | 8/1976 | West et al. | 280/21.1 |
| 4,077,639 | A | | 3/1978 | Reedy | |
| 4,491,333 | A | | 1/1985 | Warnke | |
| 5,109,941 | A | | 5/1992 | Thompson | |
| 5,209,505 | A | | 5/1993 | Bastille et al. | |
| 5,344,168 | A | | 9/1994 | Olson et al. | |
| 5,443,278 | A | | 8/1995 | Berto | |
| 5,836,594 | A | * | 11/1998 | Simmons | 280/28 |
| 6,105,979 | A | | 8/2000 | Desrochers | |
| 6,276,699 | B1 | * | 8/2001 | Simmons et al. | 280/28 |
| 6,378,889 | B1 | | 4/2002 | Moriyama et al. | |
| 6,431,561 | B1 | | 8/2002 | Hedlund | |
| 6,520,512 | B1 | | 2/2003 | Lachance | |
| D473,488 | S | | 4/2003 | Mallette et al. | |
| D478,841 | S | | 8/2003 | Bruns | |
| D480,332 | S | | 10/2003 | Cormican | |
| 6,692,009 | B2 | | 2/2004 | Lemieux | |
| 6,705,620 | B2 | | 3/2004 | Bruns | |
| 6,772,061 | B1 | | 8/2004 | Berthiaume et al. | |
| RE39,012 | E | | 3/2006 | Noble et al. | |
| 7,017,695 | B2 | | 3/2006 | Meunier et al. | |
| 7,287,763 | B1 | * | 10/2007 | Beaudoin | 280/28 |
| 7,481,437 | B2 | * | 1/2009 | Musselman | 280/28 |

(Continued)

*Primary Examiner* — John R Olszewski

(74) *Attorney, Agent, or Firm* — John R. S. Orange; Blake, Cassels & Graydon LLP

(57) ABSTRACT

A snowmobile ski comprises a body having a pair of rails laterally spaced from one another and interconnected at a tip. A mounting on the body secures the ski to a snowmobile.

37 Claims, 5 Drawing Sheets

U.S. PATENT DOCUMENTS

| | | |
|---|---|---|
| 2001/0022435 A1 | 9/2001 | Cormican |
| 2001/0032744 A1 | 10/2001 | Moriyama |
| 2002/0036387 A1 | 3/2002 | Lemieux |
| 2002/0074752 A1 | 6/2002 | Noble |
| 2002/0149174 A1 | 10/2002 | Cormican |
| 2003/0160405 A1 | 8/2003 | Bruns |
| 2003/0189302 A1 | 10/2003 | Makitalo |
| 2003/0234500 A1 | 12/2003 | Roberts et al. |
| 2004/0099458 A1 | 5/2004 | Meunier et al. |
| 2005/0252705 A1* | 11/2005 | Abe et al. ............. 180/190 |
| 2006/0033294 A1 | 2/2006 | Roberts et al. |
| 2006/0061051 A1 | 3/2006 | Lemieux |
| 2006/0061052 A1 | 3/2006 | Lemieux |
| 2006/0076742 A1 | 4/2006 | Scholl |
| 2006/0163826 A1 | 7/2006 | Huntimer et al. |
| 2006/0175777 A1 | 8/2006 | Lemieux et al. |
| 2007/0069487 A1 | 3/2007 | Lemieux et al. |
| 2007/0182111 A1* | 8/2007 | Lachance ............. 280/28 |
| 2007/0257453 A1 | 11/2007 | Lemieux et al. |

* cited by examiner

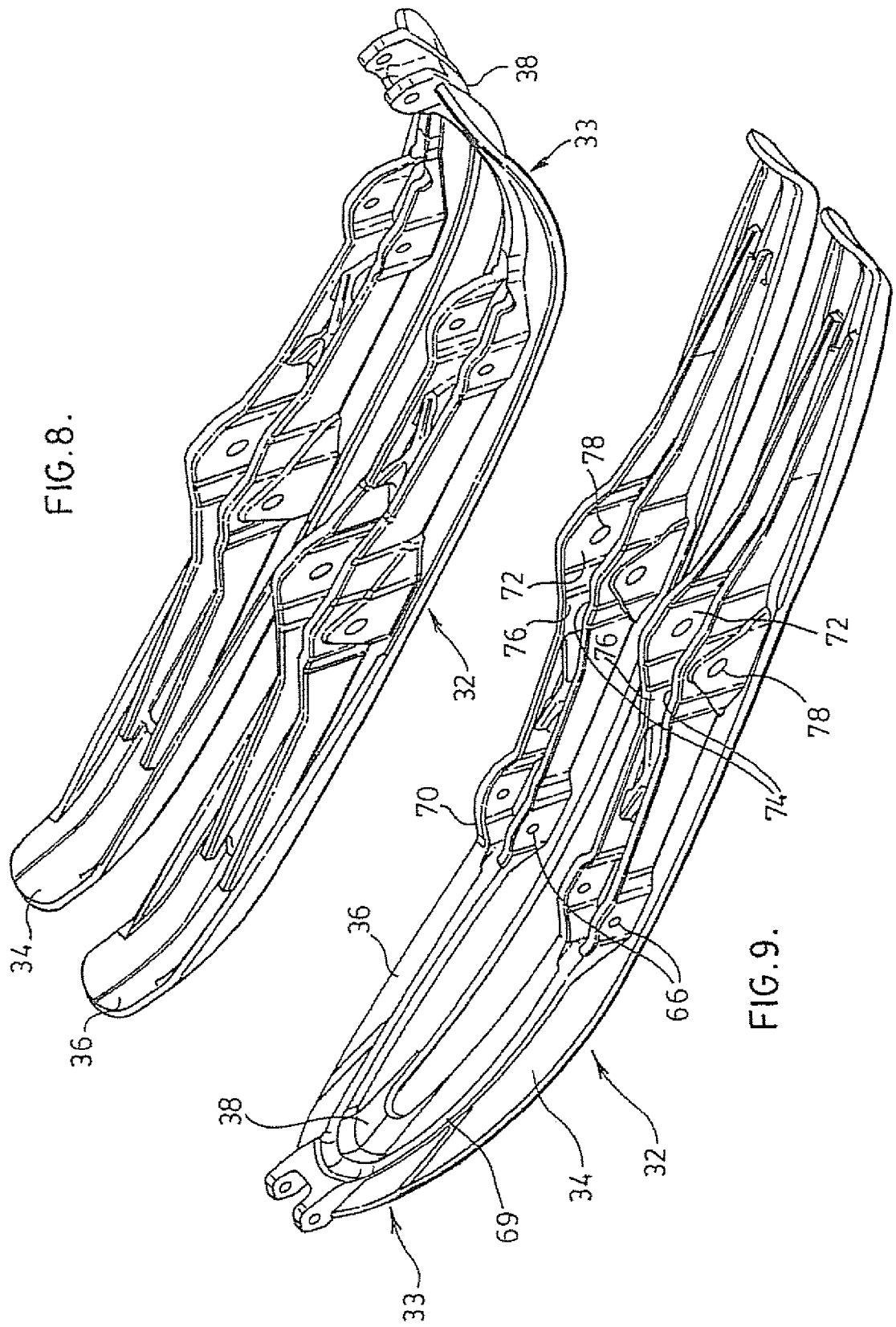

SNOWMOBILE SKI ASSEMBLY

This application claims priority from U.S. Application No. 60/894,252 filed on Mar. 12, 2007, the contents of which are incorporated herein by reference.

FIELD OF THE INVENTION

The present invention relates to snowmobiles in particular to skis for such snowmobiles.

DESCRIPTION OF THE PRIOR ART

The snowmobile is a well known class of machine and is used for transportation over snow. The snowmobiles typically have a belt to provide traction over the snow at the rear of the machine and a pair of ski's at the front of the machine. The ski's are steerable so that the operator can steer the snowmobile around the desired course.

Snowmobiles are used in a variety of conditions from ice to fresh snow. As the design of snowmobile has evolved, the skis have themselves become more sophisticated to match the higher performance expectations of the snowmobile. Initially, a single runner was utilized on the underside of the ski to improve lateral traction. However, it was found that a single runner tended to follow the track left by other machines, causing the snowmobile to "dart." A further development used a pair of parallel runners on the underside of the ski. Whilst this mitigates the darting, in certain conditions notably in powder snow, the skis are prone to floating which results in a loss of lateral traction and a resultant loss of steering. This is in part due to the tunnel structure used on the underside of the ski's with the parallel runners. In soft snow, the body of the ski may inhibit the runners from contacting the more solid snow and thereby limit the lateral resistance to that offered by the soft snow.

It is therefore an object of the present invention to provide a ski for a snowmobile in which the above disadvantages are obviated or mitigated.

SUMMARY OF THE INVENTION

In general terms, the present invention provides a snowmobile ski having a bifurcated body. The body is formed from a pair of laterally spaced rails which are interconnected at the tip into a unitary construction. Each of the rails has a runner on the underside. In use, the lateral spacing between the rails permits the snow to pass between the rails and thereby inhibit excessive floating in soft or powder snow conditions.

Preferably, the ski is supported upon on a spindle whose lower portion is bifurcated to provide passage of the snow past the spindle.

As a further preference, the ski includes a stabilizer bar extending from the tip to a portion of each of the ski's forward of the spindle. The distal end of the stabilizer bar is bifurcated to facilitate the passage of snow past the stabilizer bar.

BRIEF DESCRIPTION OF THE DRAWINGS

An embodiment of the invention will now be described by way of example only with reference to the accompanying drawings in which:

FIG. 8 is a front perspective view of a ski shown in FIG. 2.
FIG. 9 is a rear perspective view of the ski of FIG. 8.

DETAILED DESCRIPTION OF THE INVENTION

Figure 1:
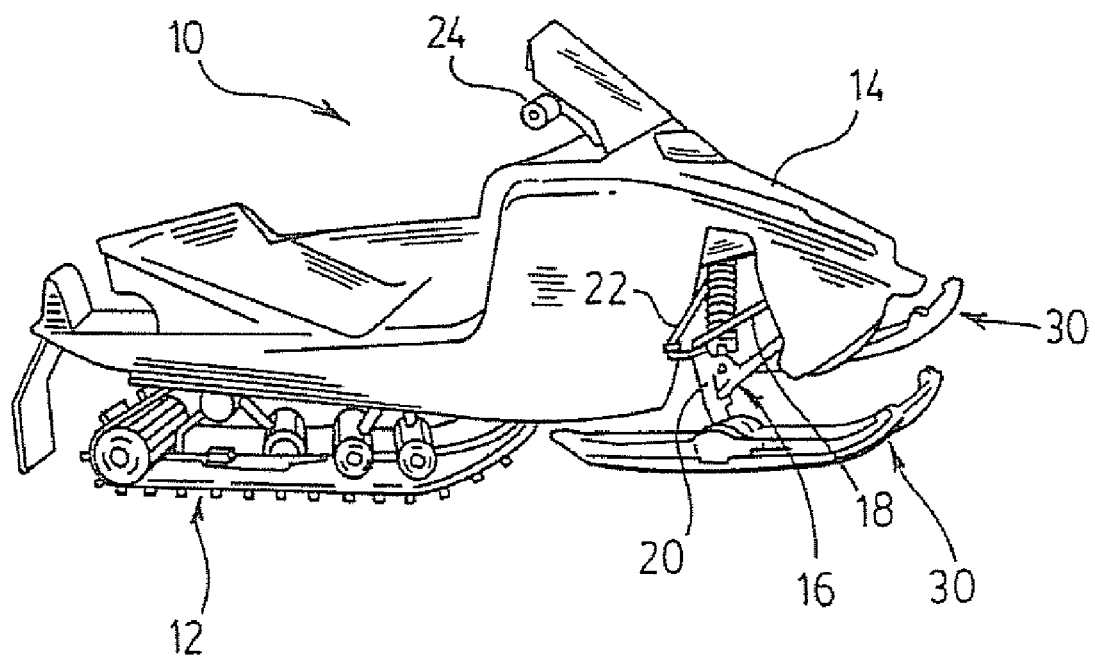
FIG. 1 is a side view of a snowmobile.

Referring therefore to the drawings, a snowmobile generally indicated 10 includes a traction drive 12 supporting a superstructure 14. The forward portion of the superstructure 14 is supported on a suspension assembly 16 that includes suspension arm 18 connected to a spindle 20. The spindle 20 is rotatable about a vertical axis relative to the suspension arm 18 and is connected through a steering link 22 to an operator control 24. The lower end of the spindle 20 is connected to a ski assembly 30 shown in greater detail in FIGS. 2 through 5 and 8 and 9.

It will be appreciated that the ski assembly 30 is similar on each side of the snowmobile except as to hand, and therefore only one such ski assembly will be described in detail. The overall dimensions of the skis will vary from machine to machine but will generally be similar to those found on conventional higher performance snowmobiles and constructed from similar materials.

Figure 2:
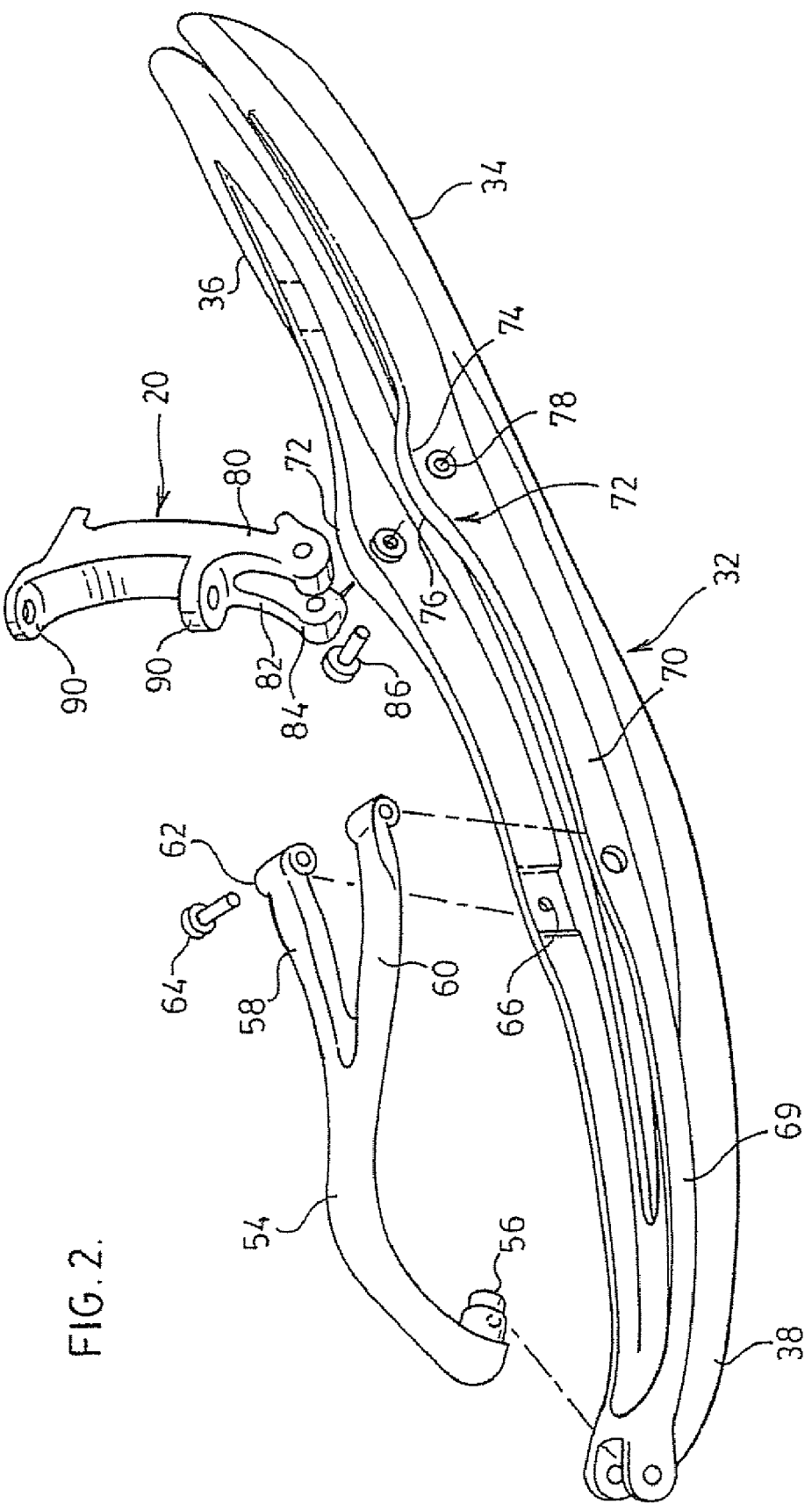
FIG. 2 is an exploded perspective view of a ski assembly.

Referring therefore to FIGS. 2, 8 and 9 the ski assembly 30 includes a ski 32 typically moulded from a plastics material. The ski 32 has a body 33 formed with a pair of rails 34, 36 that are laterally spaced from one another over substantially the entire length of the ski body 33. The rails 34, 36 are connected at the tip 38 to provide a unitary construction.

Figure 3:
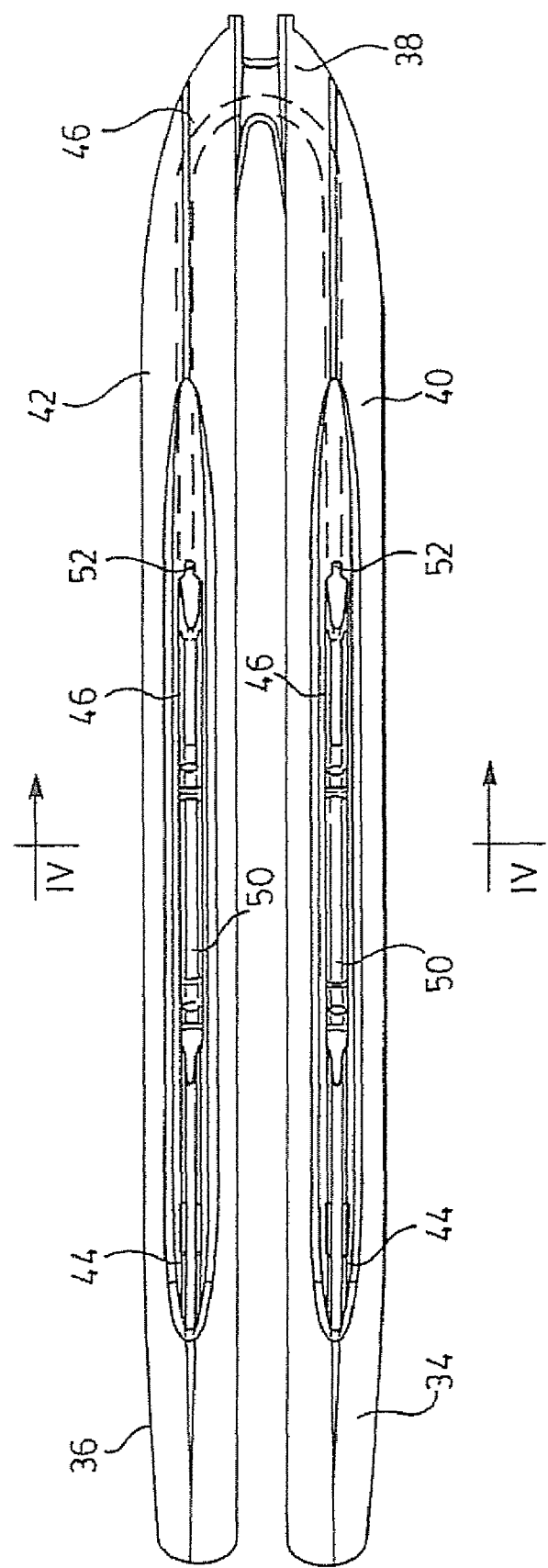
FIG. 3 is a view from the underside of the ski assembly shown in FIG. 2.
Figure 4:
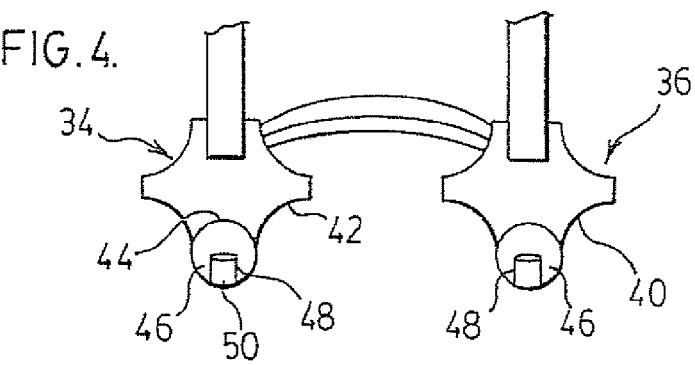
FIG. 4 is a view on the line IV-IV of FIG. 3.

As shown in FIGS. 3 and 4, each of the rails 34, 36 has a under surface 40, 42 respectively that is formed with a concave cylindrical recess 44. The recess 44 is dimensioned to receive a steel runner 46 that is secured in the recess 44 by a bolt (not shown) extending through the body of the rail. The runner 46 has longitudinal slots 48 formed in its lower surface to receive a carbide insert 50. The carbide insert 50 provides a wear resistant insert to the runner 46.

Figure 5:
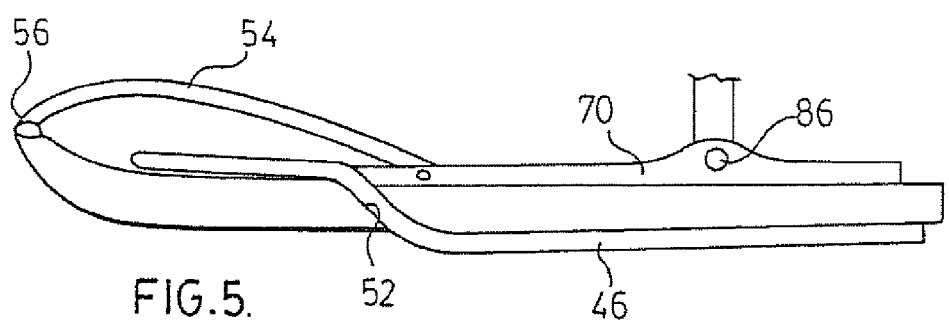
FIG. 5 is a view on the line V-V of FIG. 3.

As can best be seen in FIG. 5, the runner 46 extends partially along the under surface 40, 42 of each of the rails 34, 36. The rails 34, 36 are formed with an aperture 52 which permits the runner 46 to pass through the rail from the lower surface 40, 42 to the opposite upper surface. The runner 46 extends toward and across the tip 38 of the ski 32, as shown in dotted lines in FIG. 3, so as to form a continuous runner alone each of the rails 34, 36. The continuous runner enhances the strength for high performance.

As best seen in FIG. 2, a stabilizer bar 54 is secured to the tip 38 through a universal joint assembly 56 and extends rearwardly for attachment to the ski. The stabilizer bar 54 is bifurcated so as to provide a pair of arms 58, 60 that progressively diverge in a rearward direction. The distal end of each of the arms 58, 60 is formed with a bushing 62 that receives a connecting bolt 64. The bushing 62 may be elastomeric or steel bushings depending upon the application and the bolts 64 are received in holes 66 formed in spaced upstanding flanges 70 formed on the upper surface of each of the rails 34, 36. A rib 69 extends rearwardly from the tip 38 to the flanges 70. The flanges 70 extend along the rails 34, 36 to provide a socket 72 to receive the spindle 20 and provide a mounting point for the ski body 33. The socket 72 has a pair of laterally spaced walls 74, 76 with reinforced holes 78 integrally formed with the walls 74, 76.

The spindle 20 is bifurcated at its lower end to provide a pair of legs 80, 82 that are received in respective ones of the sockets 72 between the walls 74, 76. The legs 80, 82 have lateral bores 84 for alignment with the reinforced holes 78 to receive connecting bolts 86. The spindle 20 is connected to the suspension arms through mounting holes 90 in conventional manner.

Figure 6:
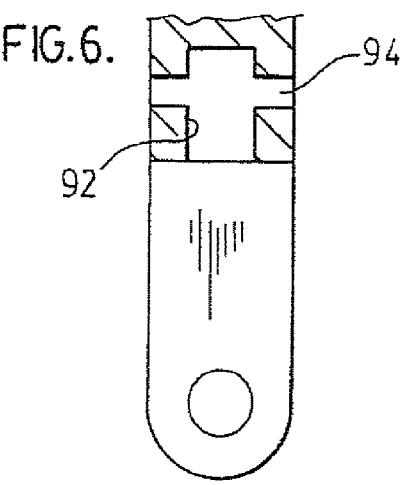
FIG. 6 is a section of a portion of a spindle shown in FIG. 2.
Figure 7:
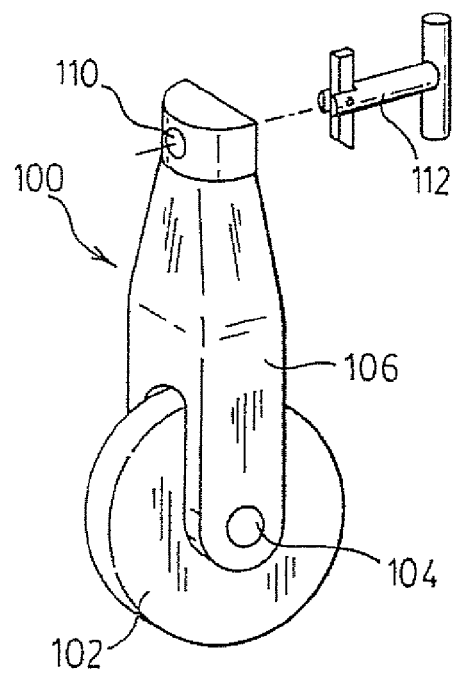
FIG. 7 is a perspective view of a wheel assembly used with the ski assembly of FIG. 2.

As can best be seen in FIG. 6, legs 80, 82 on spindle 20 terminate in a bore 92 that is asymmetric in cross section. As shown, the bore 92 is part cylindrical with a flat on one side to provide a D shaped cross section. A hole 94 extends through the walls of the bore 92. A wheel assembly indicated 100 in FIG. 7 includes a wheel 102 supported on spindle 104 at the lower end of a vertical leg 106. The vertical leg 106 is dimensioned at its upper end to be received in the bore 92. A hole 110 extends through the leg 106 for alignment with the hole 94 in the legs 80, 82 so that a securing pin 112 may hold the wheel 100 in situ such that the axle is perpendicular to the length of the ski. Vertical leg 106 has shoulders (not shown) mating with the spindle to support the weight of the machine on the ground, thereby decreasing stress on securing pin 112.

In use on snow, the laterally spaced ski rails 34, 36 provides support for the runner 46. Flotation of the ski body 32 is inhibited by permitting the snow to pass between the ski rails 34, 36 and thereby allow the runner 46 to descend through soft snow to a firmer stratum of packed snow. The bifurcation of the stabilizer bar 56 and the spindle 20 provides a clear passage for the snow through the ski assembly 32 to minimize build up of snow and drag.

The spindle 20 secures the two ski rails 34, 36 to one another whilst permitting limited independent flexure as the ski assembly passes over the snow. The runner 46 contributes to the torsional resilience and bending strength of the ski whilst providing an enhanced contact with the firm or packed snow. A continuous runner is preferred for improved performance but it will be appreciated that a pair of runners may be used, one on each rail 34, 36, for less arduous conditions.

If it is necessary to transport the snowmobile over open ground, the wheel assembly 100 may be inserted between the rails 34, 36 and secured in the bore 92. The locking pin may then be inserted through the holes 94 and 110 to lock the wheels in position below the ski assembly. In this manner, the under side of the skis are elevated from the ground allowing the machine to be rolled along the ground without damage to the skis. The D shaped cross section inhibits rotation of the wheel about a vertical axis with the weight transferred along the spindle 20 so as not to load the locking pin 112.

The invention claimed is:

1. A snowmobile ski comprising a body having a pair of rails each having an upwardly curved portion adjacent to one end and laterally spaced from one another, said rails being interconnected at a tip at said one end, each rail having an under surface, an upper surface oppositely directed to said under surface, an inner side surface, and an outer side surface, each of said side surfaces extending from a respective one of said under surfaces to a respective one of said upper surfaces, said inner side surfaces being laterally spaced from one another to provide a gap in said body extending from said tip through said curved portion to an opposite end of said body to permit snow to pass therethrough from the lower surface to the upper surface, each of said rails having an upstanding flange extending longitudinally along said rail and a mounting formed on said flange to secure said ski to a snowmobile.

2. A snowmobile ski according to claim 1 wherein said mounting is a socket formed on respective ones of said rails.

3. A snowmobile ski according to claim 2 wherein said socket has a pair of laterally spaced walls integrally formed with said flange.

4. A snowmobile ski according to claim 1 wherein said body is moulded from a plastic material.

5. A snowmobile ski according to claim 4 wherein said rails are connected at said tip to provide a unitary construction.

6. A snowmobile ski comprising a body having a pair of rails interconnected at a tip at one end, each rail having an under surface, an upper surface oppositely directed to said under surface, an inner side surface, and an outer side surface, each of said side surfaces extending from a respective one of said under surfaces to a respective one of said upper surfaces, said inner side surfaces being laterally spaced from one another to provide a gap in said body extending from said tip to an opposite end of said body to permit snow to pass therethrough from the lower surface to the upper surface and a mounting on said body to provide a sole attachment to secure said ski to a snowmobile, the underside of each of said rails being formed with a rib to project downwardly from the body, each of said ribs having a part cylindrical recess to receive a runner, said runners being interconnected at said tip.

7. A snowmobile ski according to claim 6 wherein said runners extend through said rails from an underside to said upper surface intermediate said tip and said mounting.

8. A snowmobile ski according to claim 6 wherein said runners include a cavity to receive a hardened insert.

9. A snowmobile ski comprising a body having a pair of rails interconnected at a tip at one end, each rail having an under surface, an upper surface oppositely directed to said under surface, an inner side surface, and an outer side surface, each of said side surfaces extending from a respective one of said under surfaces to a respective one of said upper surfaces, said inner side surfaces being laterally spaced from one another to provide a gap in said body extending from said tip to an opposite end of said body to permit snow to pass therethrough from the lower surface to the upper surface and a single mounting on said body to provide a sole attachment to secure said ski to a snowmobile, said mounting including a mounting point on each of said rails intermediate said ends to permit pivotal movement of said snowmobile ski and independent flexure of said opposite ends of said rails.

10. A snowmobile ski according to claim 9 wherein said mounting point is a socket formed on an upper surface of respective ones of said rails.

11. A snowmobile ski according to claim 10 wherein said socket is formed by a pair of laterally spaced walls.

12. A snowmobile ski comprising a body having a pair of rails interconnected at a tip at one end, a stabilizer bar extending from said tip and secured to each of said rails at respective locations spaced from the tip, each rail having an under surface, an upper surface oppositely directed to said under surface, an inner side surface, and an outer side surface, each of said side surfaces extending from a respective one of said under surfaces to a respective one of said upper surfaces, said inner side surfaces being laterally spaced from one another to provide a gap in said body extending from adjacent to said tip to an opposite end of said body to permit snow to pass therethrough from the lower surface to the upper surface and a mounting on said body to secure said ski to a snowmobile.

13. A snowmobile ski according to claim 12 wherein said stabilizer bar is bifurcated to provide a pair of arms, each extending to a respective one of said rails to facilitate passage of snow between stabilizer bar arms past said stabilizer bar.

14. A snowmobile ski according to claim 13 wherein said arms are connected to respective flanges extending longitudinally on an upper surface of respective ones of said rails.

15. A snowmobile ski according to claim 13 wherein said stabilizer bar is pivotally connected to said body at said tip.

16. A snowmobile ski assembly comprising a body having a pair of rails laterally spaced from one another and interconnected at a tip, each rail having a lower surface, an upper surface oppositely directed to said lower surface, an inner side surface, and an outer side surface, each of said side surfaces extending from a respective one of said lower surfaces to a respective one of said upper surfaces, said inner side surfaces being spaced from one another to provide a gap in said body to permit snow to pass therethrough from said lower surface to said upper surface, a single mounting on said body to provide a sole attachment to secure said ski to a snowmobile, said mounting including a mounting point on each of said rails intermediate said ends to permit pivotal movement of said snowmobile ski and independant flexure of said opposite ends of said rails, and a spindle connected to said mounting to secure said ski assembly to a snowmobile.

17. A snowmobile ski assembly according to claim 16 wherein said spindle is bifurcated to provide a pair of legs, each of which is connected to a respective one of said rails to facilitate passage of snow between spindle legs past said spindle.

18. A snowmobile ski assembly according to claim 17 wherein each of said legs is pivotally connected to a respective one of said rails.

19. A snowmobile ski assembly according to claim 18 wherein each of said legs is received in a socket formed on an upper surface of each of said rails.

20. A snowmobile ski assembly according to claim 19 wherein said socket has a pair of laterally spaced walls and respective ones of said legs are received between said walls.

21. A snowmobile ski assembly according to claim 20 wherein a pin extends between said walls and through said legs to connect pivotally said spindle and said body.

22. A snowmobile ski assembly according to claim 17 wherein said gap extends from adjacent said tip to an opposite end of said body.

23. A snowmobile ski assembly according to claim 17 wherein a stabilizer bar extends from said tip to each of said rails at respective locations spaced from said tip, said stabilizer bar being bifurcated to provide a pair of arms, each extending to a respective one of said rails and to respective sides of said gap to facilitate passage of snow through said gap.

24. A snowmobile ski assembly according to claim 23 wherein each arm of said stabilizer bar is arcuate and each extends over a respective one of said upper surfaces of said rails.

25. A snowmobile ski assembly according to claim 23 wherein each arm of said stabilizer bar pivotally connected to a respective one of said upper surfaces of said rails.

26. A snowmobile ski assembly according to claim 25 wherein each arm of said stabilizer bar is connected to upstanding flanges of said upper surfaces of said rails.

27. A snowmobile ski assembly according to claim 17 wherein said mounting includes a pair of laterally spaced walls extending from said upper surfaces of said rails and a respective one of said legs is received between each of said pairs of laterally spaced walls.

28. A snowmobile ski assembly according to claim 27 wherein a pin extends between each of said pair of walls and through respective ones of said legs to secure pivotally each of said legs to a rail.

29. A snowmobile ski assembly according to claim 16 wherein a wheel assembly is secured to said spindle between said legs to project beyond said rails.

30. A snowmobile ski assembly according to claim 29 wherein said wheel assembly is removable and secured to said spindle.

31. A snowmobile ski assembly according to claim 30 wherein said wheel is secured in an asymmetric bore in said spindle to inhibit relative rotation between said spindle and wheel assembly.

32. A snowmobile ski comprising a body having a pair of rails laterally spaced from one another and interconnected at a tip, each rail having an under surface, an upper surface oppositely directed to said under surface, an inner side surface, and an outer side surface, each of said side surfaces extending between respective ones of said under surfaces and said upper surfaces, said inner side surfaces being laterally spaced from one another to provide a gap in said body extending from said tip to an opposite end of said body to permit snow to pass therethrough; a stabilizer bar extending from said tip to each of said rails at respective locations spaced from the tip, said stabilizer bar being bifurcated to provide a pair of arms, each extending to a respective one of said rails and to respective sides of said gap to facilitate passage of snow through said gap; and a mounting on said body to secure said ski to a snowmobile.

33. A snowmobile ski according to claim 32 wherein each arm of said stabilizer bar is arcuate and each extends over a respective one of said upper surfaces of said rails.

34. A snowmobile ski according to claim 33 wherein each arm of said stabilizer bar is pivotally connected to a respective one of said upper surfaces.

35. A snowmobile ski according to claim 34 wherein each arm is connected to upstanding flanges formed on said upper surface.

36. A snowmobile ski according to claim 35 wherein said mounting includes a pair of laterally spaced walls extending from said upper surface.

37. A snowmobile ski according to claim 36 wherein said flanges extend along said upper surface to said walls.

* * * * *